(12) United States Patent
Lee

(10) Patent No.: US 7,739,023 B2
(45) Date of Patent: Jun. 15, 2010

(54) ADAPTIVE CRUISE CONTROL SYSTEM AND METHOD FOR VEHICLE

(75) Inventor: Chankyu Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 894 days.

(21) Appl. No.: 11/592,837

(22) Filed: Nov. 3, 2006

(65) Prior Publication Data

US 2007/0142996 A1    Jun. 21, 2007

(30) Foreign Application Priority Data

Dec. 17, 2005    (KR) .................. 10-2005-0124968

(51) Int. Cl.
*B60T 7/12* (2006.01)
(52) U.S. Cl. .................. 701/96; 701/93; 701/70; 701/110; 123/350; 180/170
(58) Field of Classification Search .................. 701/93, 701/96, 300, 70, 110; 123/350; 180/170
See application file for complete search history.

(56) References Cited

U.S. PATENT DOCUMENTS

| | | | | |
|---|---|---|---|---|
| 6,304,808 | B1 * | 10/2001 | Milot | 701/91 |
| 6,970,777 | B2 * | 11/2005 | Tange et al. | 701/41 |
| 7,016,777 | B2 * | 3/2006 | Suzuki et al. | 701/70 |
| 7,027,920 | B2 * | 4/2006 | Madau | 701/301 |
| 7,337,047 | B2 * | 2/2008 | Ueno et al. | 701/38 |
| 7,337,055 | B2 * | 2/2008 | Matsumoto et al. | 701/93 |
| 7,561,954 | B2 * | 7/2009 | Aizawa et al. | 701/79 |
| 2004/0215385 | A1 * | 10/2004 | Aizawa et al. | 701/93 |
| 2005/0113999 | A1 * | 5/2005 | Tange et al. | 701/41 |
| 2005/0216162 | A1 * | 9/2005 | Suzuki et al. | 701/70 |
| 2005/0240334 | A1 * | 10/2005 | Matsumoto et al. | 701/93 |
| 2007/0142996 | A1 * | 6/2007 | Lee | 701/96 |
| 2009/0069995 | A1 * | 3/2009 | Ishida et al. | 701/93 |

FOREIGN PATENT DOCUMENTS

| | | | |
|---|---|---|---|
| JP | 11-287930 | * | 10/1999 |
| JP | 2000-351656 | * | 11/2000 |
| JP | 2002-019489 | | 1/2002 |
| JP | 2002-250997 | * | 8/2002 |
| JP | 2003-395587 | * | 11/2003 |
| JP | 2004-073125 | * | 3/2004 |

(Continued)

OTHER PUBLICATIONS

Numberical Analysis on the Steady-State Rolling of Load-Carrying Tire; You Shan Wang et al., Intelligent Computation Technology and Automation, 2009. ICICTA '09. Second International Conference on; vol. 4; Digital Object Identifier: 10.1109/ICICTA.2009.851; Publication Year: 2009 , pp. 566-569.*

(Continued)

*Primary Examiner*—Cuong H Nguyen
(74) *Attorney, Agent, or Firm*—Morgan, Lewis & Bockius LLP

(57) ABSTRACT

The present invention provides a vehicular adaptive cruise control system and method that can adapt in real-time to tire and road conditions, vehicular weight, dynamics of the host vehicle, as well as other factors, to offer improved collision avoidance and warning.

21 Claims, 6 Drawing Sheets

FOREIGN PATENT DOCUMENTS

| | | | |
|---|---|---|---|
| JP | 2004-128340 | * | 4/2004 |
| JP | 2007-232072 | * | 9/2007 |

OTHER PUBLICATIONS

A.L. Tod and S.Ilinca, "An algorithm for incorporation of frictional sliding conditions within a steady state rolling framework," Communications in Numerical Methods in Engineering, vol. 22, 2006, pp. 301-318.*

The Road Friction Coefficient Estimation Based on Extended Kalman Filter; Zhu Tianjun et al., Intelligent Systems and Applications, 2009. ISA 2009. International Workshop on; Digital Object Identifier: 10.1109/IWISA.2009.5073206 Publication Year: 2009, pp. 1-4.*

Holzman, Frederic, Bellino,Mario (2008). "Predictive estimation of the road-tire friction coefficient". Proc. IEEE Int. Conf. Control Appl, pp. 885-890.*

Dakhlallah, J, Glaser,S (2008). "Tire-road forces estimation using extended Kalman Filter and sideslip angle evaluation". Proceedings of the American Control Conference, pp. 4597-4602.*

A robust nonlinear of an Electric Vehicle in traction; Sallem, S. et al., Systems, Signals and Devices, 2009. SSD '09. 6th International Multi-Conference on; Digital Object Identifier: 10.1109/SSD.2009.4956740; Publication Year: 2009, pp. 1-6.*

Hong Liang et al., 'Designing a sliding mode controller for slip control of antilock brake systems', Transport. Res. Part C (2008), doi: 10.1016/j.trc.2008.02.003.*

Keun-Ho Hyum, 'Design of a speed Controller for Permanent Magnet Synchronous Motor in Pure Electric Vehicle Applications' International Conference on Control, Automation and Systems 2007.*

M. Oudghiri et al., 'Robust Fuzzy Sliding Mode Control for Antilock Braking System', IJ-STA, vol. 1, N° 1, Jun. 2007.*

Research on the variable structure control for the aircraft anti-slid braking systems; Xue Xiang-rong et al., Control and Decision Conference, 2008. CCDC 2008. Chinese Digital Object Identifier: 10.1109/CCDC.2008.4597846; Publication Year: 2008, pp. 2855-2859; IEEE Conferences.*

Driving force control method for front-and-rear-wheel-independent-drive-type electric vehicles (FRID EVs) effective for safe driving under various road conditions;Mutoh, N. et al..; Vehicle Power and Propulsion Conference, 2008. VPPC '08. IEEE Digital Object Identifier: 10.1109/VPPC.2008.4677756 Publication Year: 2008.*

Methods to Control Wheel Locks and Wheel Spins for Electric Vehicles with the Structure Having Independently Driven Front and Rear Wheels; Mutoh, N. et al.,Industry Applications Conference, 2006. 41st IAS Annual Meeting. Conference Record of the 2006 IEEE, vol. 3, Digital Object Identifier: 10.1109/IAS.2006.256742, Publication Year: 2006.*

* cited by examiner

ADAPTIVE CRUISE CONTROL SYSTEM AND METHOD FOR VEHICLE

CROSS-REFERENCE TO RELATED APPLICATION

This application claims priority to and the benefit of Korean Patent Application No. 10-2005-0124968 filed in the Korean Intellectual Property Office on Dec. 17, 2005, the content of which is incorporated herein by reference in its entirety.

BACKGROUND OF THE INVENTION (a) Field of the Invention

The present invention relates to a cruise control system and method for a vehicle.

(b) Description of the Related Art

With increased number of vehicles and congestion on the roadways, the need for more intelligently designed safety mechanisms is greater than ever before. In particular, efforts have been directed to creating improved anti-collision systems and methods. While adaptive cruise control (ACC) systems can help ensure the safety and comfort of the driver and his passengers even under complex road conditions, conventional cruise control systems cannot reliably avoid a collision or for warning against a collision.

In conventional ACC systems, once a running speed is set on a host vehicle, the ACC system on the host vehicle takes in certain load conditions and the running speed of the preceding vehicle as detected by sensors and, based on these parameters, controls the throttle actuator or brake actuator to maintain the host vehicle at a fixed predetermined running speed. The host vehicle is equipped with a distance detection unit mounted at the front which sends its signals to a computer that calculates a relative velocity and relative distance from the preceding distance. The computer also executes an algorithm that calculates and sets a time gap for determining a safety distance to leave between the host vehicle and the preceding vehicle based on the current running speed of the host vehicle. The safety distance is derived by multiplying the time gap by the current running speed of the host vehicle.

In this manner, if the relative distance and relative velocity indicate that the host vehicle is in danger of colliding with the preceding vehicle, the ACC system will apply the brakes and thereby control the vehicular distance to the preceding vehicle based on the predetermined time gap. When the threshold braking distance of the host vehicle as it corresponds to the current running speed thereof is less than the calculated safety distance, the ACC system operates the brake actuator or the throttle actuator until the distance from the preceding vehicle exceeds the predetermined safety distance.

Once the distance from the preceding vehicle exceeds the calculated safety distance due to the reduced running speed of the host vehicle, the ACC system will increase the running speed of the host vehicle to the original fixed running speed by recovering an engine torque.

One of the reasons for the imperfect anti-collision mechanisms of conventional ACC system is the manner by which the time gap is determined. As those of skill in the art will recognize, the time gap in conventional ACC systems cannot be readily modulated by a driver. Even in conventional systems that allow the driver to select the time gap to be one of three phases, Far, Med, and Close, the mechanism for control is such that it presents difficulty and danger for a driver attempting to adjust the time gap while driving. The simple fashion by which the time gap is determined is also a cause for concern. Assuming the predetermined time gaps of a host vehicle running at a speed of 100 km/h to be 2.0, 1.5, and 1.0 s, the distance from the preceding vehicle to be maintained would be 55 m, 42 m, and 28 m, respectively, using conventional ACC systems. The time gap is set with the assumption that the friction coefficient between each tire and a road is 1.0 and the maximum deceleration of the host vehicle is 9.8 m/s$^2$. With these oversimplified conditions, the minimum braking distance for a host vehicle at a running speed of 100 km/h is 38 m and would appear well within the calculated safety distance of 55, 42, and 28 m.

Unfortunately, the assumption relied upon in conventional ACC system can be a fatal one as the friction coefficient between each tire and the road is not always 1.0. As shown in FIG. 6, the friction coefficient between each tire and the road can vary significantly depending on road/weather conditions. The friction coefficient between each tire and the road can also vary considerably due to the type of road surface, e.g. asphalt, concrete road, unpaved, etc.), thread design or degree of wearing on each tire. For example, the friction coefficient and the maximum deceleration for a vehicle on a concrete road with a new tire on a sunny day is about twice as large as the friction coefficient and the maximum deceleration for the same vehicle on an asphalt road with an old tire on a rainy day.

Conventional ACC systems fail to account for variations in the friction coefficient between each tire and the road when calculating the minimum safety distance. In addition, the maximum deceleration in the conventional ACC system is fixed to the value of 9.8 m/s$^2$. As such, conventional ACC systems cannot be relied upon to provide the appropriate minimum safety distance and to avoid a collision between the host vehicle and the preceding vehicle in an emergency.

The above information is provided only to enhance understanding of the background of the invention and therefore it may contain information that does not form the prior art with respect to the present invention.

SUMMARY OF THE INVENTION

The present invention provides an adaptive cruise control system and method for a vehicle having advantages of maintaining an appropriate safety distance between a host vehicle and a preceding vehicle.

An exemplary method for an adaptive cruise control of a vehicle according to an embodiment of the present invention includes: calculating a maximum friction coefficient of a road; calculating a minimum safety distance to a preceding vehicle based on the calculated maximum friction coefficient and a current running speed of a host vehicle; setting a reference safety index in accordance with the calculated minimum safety distance; calculating a current safety index in accordance with a relative distance to the preceding vehicle; and controlling a vehicular distance by comparing the current safety index with the reference safety index and accordingly operating an actuator.

The safety index may include a time gap that is defined as a time it would take the host vehicle to travel the minimum safety distance at the current running speed thereof.

In a further embodiment, the calculating the maximum friction coefficient of the road includes: calculating a brake gain; calculating a traction force applied on each tire; calculating a normal force applied on each tire; calculating a friction coefficient of the road on which the host vehicle is running; detecting tire and road information; calculating a slip ratio and detecting a gradient thereof; and estimating the maximum friction coefficient based on the friction coefficient and the gradient of the slip ratio.

The maximum friction coefficient increases with an increasing slip ratio of the tire. However, if the slip ratio is excessive, the maximum friction coefficient decreases with an increasing slip ratio.

The brake gain may be calculated from a brake pressure and an angular velocity of each wheel. The brake pressure is applied by a brake actuator.

The traction force may be calculated from a transmission torque and the brake gain.

The transmission torque may be calculated from a torque converter torque and the angular velocity of each wheel.

The torque converter torque may be calculated from an engine torque, a carrier speed, and a gear condition.

Furthermore, the engine torque may be calculated from a degree of throttle opening and an engine speed.

The normal force may be calculated from an entire vehicular weight and dynamics of the host vehicle.

The tire information includes information of the brake gain, the traction force, the normal force, and a tire effective radius.

The tire effective radius is defined as a distance between the road and a center of each wheel.

The road information includes a wheel speed of each wheel, the current running speed of the host vehicle, and the slip ratio of each wheel.

The wheel speed of each wheel may be detected by an angular velocity detector mounted on each wheel.

The current running speed of the host vehicle may be detected by a vehicular speed detector mounted on an output shaft of a transmission.

The slip ratio may be calculated from the angular velocity of each wheel, the current running speed, and the tire effective radius.

An exemplary system for an adaptive cruise control of a vehicle according to an embodiment of the present invention includes: a friction coefficient calculator for calculating a friction coefficient of a road; a slip ratio calculator for calculating a slip ratio between the road and each tire; a vehicular distance detector for detecting a current vehicular distance to a preceding vehicle; a slip ratio gradient detector for detecting a gradient of the slip ratio based on the friction coefficient and the slip ratio, the slip ratio gradient detector receiving a signal of the friction coefficient from the friction coefficient calculator and a signal of the slip ratio from the slip ratio calculator; a maximum friction coefficient calculator for calculating a maximum friction coefficient between the road and each tire based on the gradient of the slip ratio, the maximum friction coefficient calculator receiving a signal of the gradient of the slip ratio from the slip ratio gradient detector; a minimum safety distance calculator for calculating a minimum safety distance corresponding to the current running speed of the host vehicle based on the maximum friction coefficient, the minimum safety distance calculator receiving a signal of the maximum friction coefficient from the maximum friction coefficient calculator; a safety index calculator for calculating a reference safety index and a current safety index corresponding to the minimum safety distance and the current vehicular distance to the preceding vehicle respectively, the safety index calculator receiving a signal of the minimum safety distance from the minimum safety distance calculator and a signal of the current vehicular distance from the vehicular distance detector; a processor for comparing the current safety index with the reference safety index and generating a control signal thereby, the processor receiving a signal of the reference safety index and the current safety index from the safety index calculator; and an actuator for controlling the current running speed of the host vehicle, the actuator receiving the control signal from the processor.

The present ACC system may comprise a processor, memory and associated hardware and software as may be selected and programmed by persons of ordinary skill in the art based on the teachings of the present invention contained herein.

The friction coefficient calculator may include: a traction force calculator for calculating a traction force applied on each tire; and a normal force calculator for calculating a normal force applied on each tire.

The slip ratio calculator may include: a tire effective radius detector for detecting a distance between the road and a center of each tire; an angular velocity detector mounted on each wheel for detecting an angular velocity thereof; and a vehicular speed detector for detecting the current running speed of the host vehicle.

The traction force calculator may include: a brake gain calculator for calculating a brake gain based on brake pressure and the angular velocity of each wheel; and a transmission torque calculator for calculating a transmission torque based on a torque converter torque and the angular velocity of each wheel.

The angular velocity detector may include an angular velocity sensor mounted on each wheel.

The vehicular speed detector may include a vehicular speed sensor mounted on an output shaft of the transmission.

Figure 1:
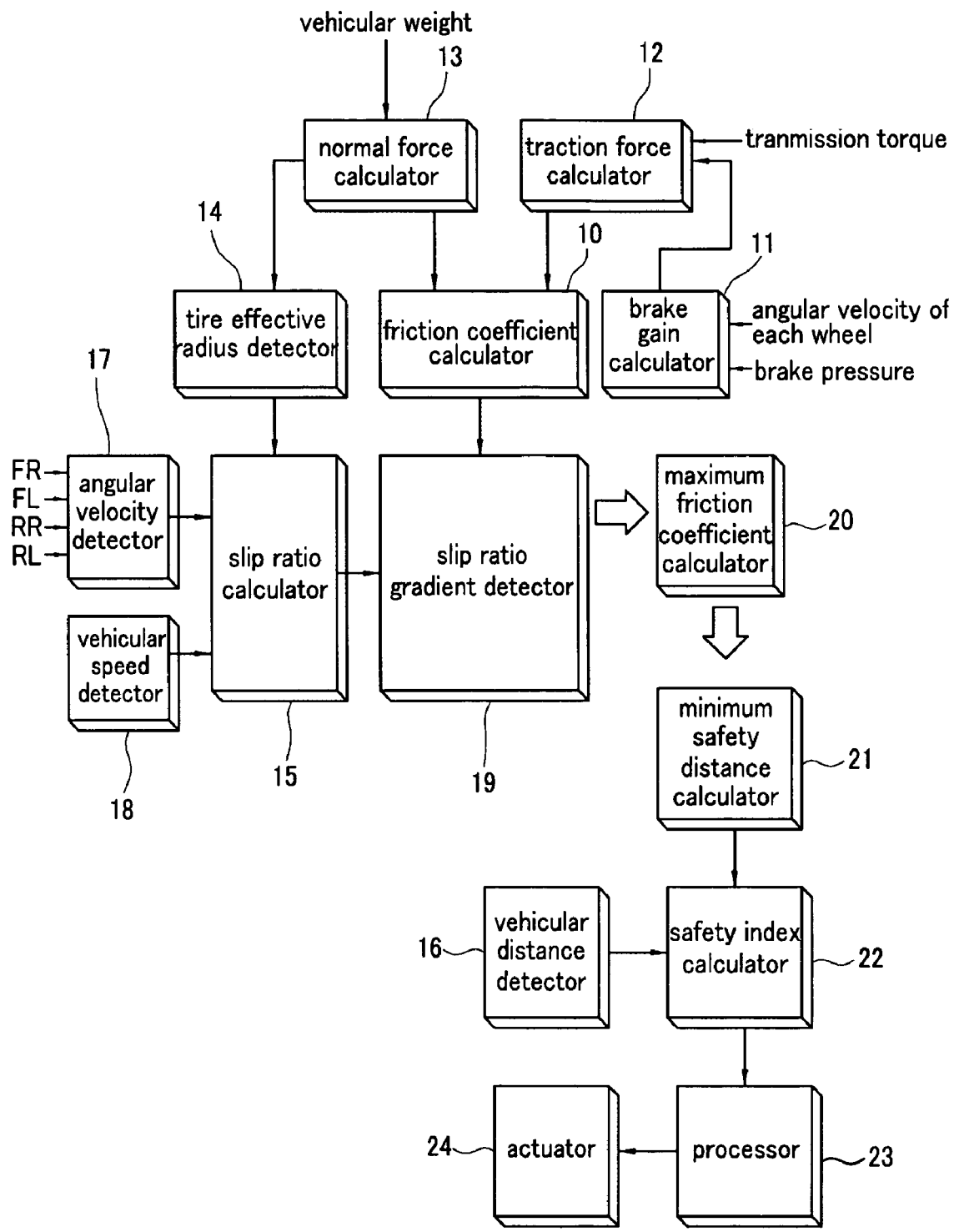
FIG. 1 shows a block diagram of an adaptive cruise control system for a vehicle according to an exemplary embodiment of the present invention.

<Legend of Reference Numerals for Elements Appearing in the Drawings>

| | |
|---|---|
| 10: friction coefficient calculator | 11: brake gain calculator |
| 12: traction force calculator | 13: normal force calculator |
| 14: tire effective radius detector | 15: slip ratio calculator |
| 16: vehicular distance detector | 17: angular velocity detector |
| 18: vehicular speed detector | 19: slip ratio gradient detector |
| 20: maximum friction coefficient calculator | 21: minimum safety distance calculator |
| 22: safety index calculator | 23: processor |
| 24: actuator | 25: transmission torque calculator |
| 26: torque converter table | 27: engine map |

DETAILED DESCRIPTION OF THE EMBODIMENTS

Exemplary embodiments of the present invention will hereinafter be described in detail with reference to the accompanying drawings.

As illustrated by the embodiment in FIG. 1, an adaptive cruise control system for a vehicle includes a friction coefficient calculator 10 for calculating a friction coefficient; a slip ratio calculator 15 for calculating a slip ratio between a road and each tire; a vehicular distance detector 16 for detecting a current vehicular distance to a preceding vehicle; a slip ratio gradient detector 19 for detecting a gradient of the slip ratio based on the calculated friction coefficient and the slip ratio; a maximum friction coefficient calculator 20 for calculating a maximum friction coefficient between the road and each tire; a minimum safety distance calculator 21 for calculating a minimum safety distance based on the calculated maximum friction coefficient and the current running speed of a host vehicle; a safety index calculator 22 for calculating a reference safety index and a current safety index corresponding to the minimum safety distance and the current vehicular distance to the preceding vehicle respectively; a processor 23 for comparing the reference safety index with the current safety index and generating a control signal thereby; and an actuator 24 for controlling the current running speed of the host vehicle corresponding to the control signal received from processor 23.

The friction coefficient calculator 10 calculates the friction coefficient between the road and each tire based on a traction force that is applied horizontally on each tire and a normal force that is applied vertically on each tire. The friction coefficient calculator 10 outputs a signal of the friction coefficient to the slip ratio gradient detector 19. The friction coefficient calculator 10 can either include a traction force calculator 12 and a normal force calculator 13 or, in the alternative, take as inputs values generated by calculators 12 and 13.

Figure 2:
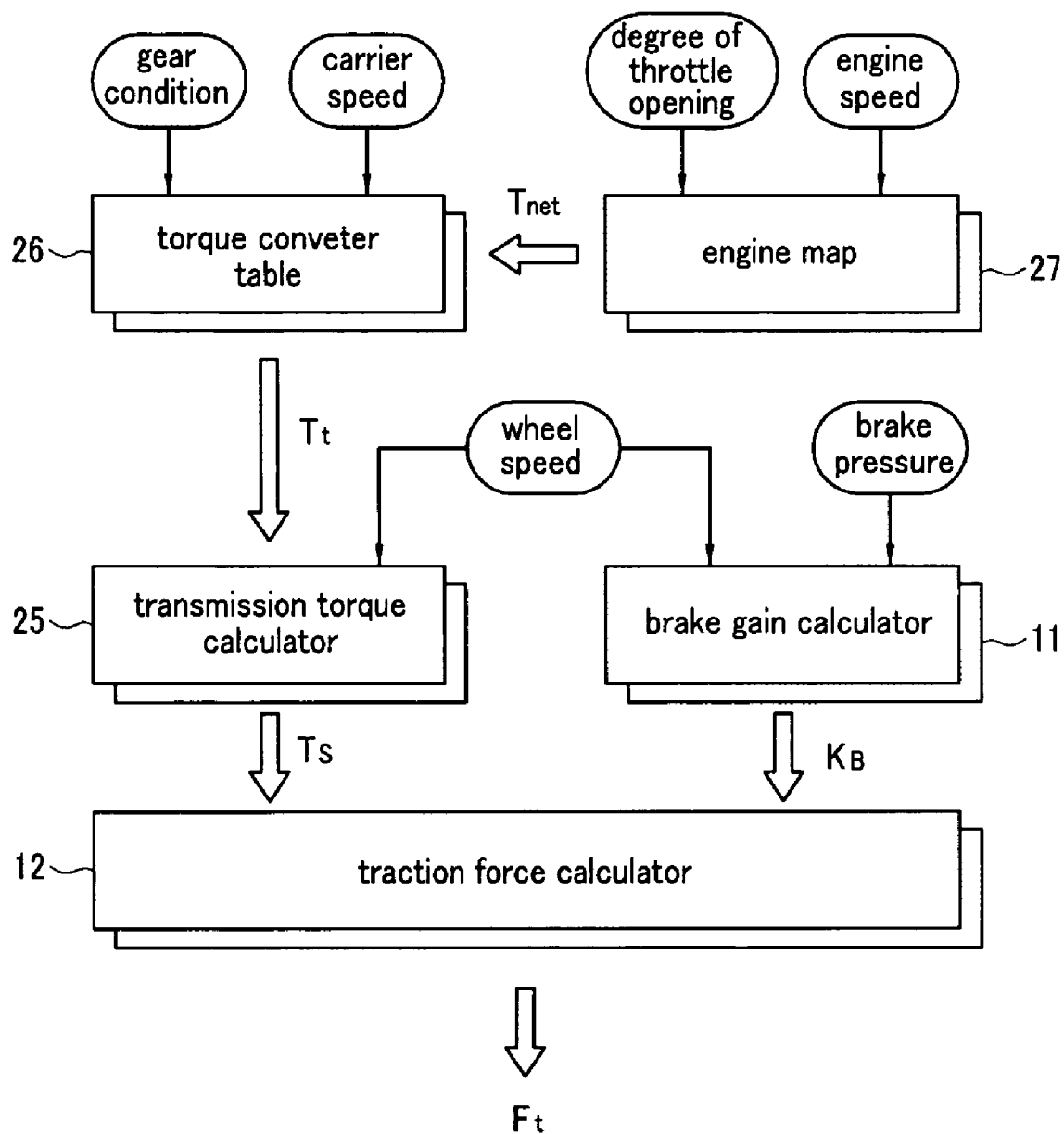
FIG. 2 shows a block diagram for calculating traction force in an adaptive cruise control system for a vehicle according to an exemplary embodiment of the present invention.

The traction force calculator 12, as shown in greater detail in FIG. 2, can include a brake gain calculator 11 and a transmission torque calculator 25 or, in the alternative, take as inputs values generated by calculators 11 and 25. The traction force calculator 12 calculates the traction force that is applied horizontally on the tire of each wheel FL ("front left"), FR ("front right"), RL ("rear left"), and RR ("rear right") from a brake gain $K_B$ and a transmission torque $T_S$. The traction force calculator 12 outputs a value of the traction force to the friction coefficient calculator 10.

The brake gain calculator 11 calculates the brake gain $K_B$ from a wheel speed that is detected by an angular velocity detector 17 mounted on each wheel and a brake pressure that is applied by a brake actuator. The brake gain calculator 11 then outputs a value of the brake gain to the traction force calculator 12.

The transmission torque calculator 25 includes an engine map 27 and a torque converter table 26. The transmission torque calculator 25 calculates a transmission torque $T_S$ from a torque converter torque $T_t$ and the wheel speed of each wheel.

As shown in FIG. 2, the engine map 27 detects an engine torque $T_{net}$ based on a degree of throttle opening and an engine speed, and outputs a signal of the engine torque $T_{net}$ to the torque converter table 26. The torque converter table 26 detects a torque converter torque $T_t$ based on the engine torque $T_{net}$, a gear condition, and a carrier speed. The torque converter table 26 outputs the value of the torque converter torque $T_t$ to the transmission torque calculator 25.

In addition, the transmission torque calculator 25 calculates a transmission torque $T_S$ from the torque converter torque $T_t$ and the wheel speed of each wheel, and outputs a signal of the transmission torque $T_S$ to the traction force calculator 12. The traction force calculator 12 calculates the traction force applied on each tire based on the transmission torque $T_S$ and the brake gain $K_B$.

The normal force calculator 13 calculates a normal force that is applied vertically on each wheel based on the total vehicular weight, including weight of the driver, passengers, and cargo, and dynamics of the host vehicle. The normal force calculator 13 outputs the value of the normal force to the friction coefficient calculator 10.

The slip ratio calculator 15 includes a tire effective radius detector 14, the angular velocity detector 17, and a vehicular speed detector 18. The slip ratio calculator 15 calculates a slip ratio of each wheel based on the wheel speed of each wheel, the current running speed of the host vehicle, and a tire effective radius, as determined by any of various algorithms known in the art. The slip ratio calculator 15 outputs the value of the slip ratio to the slip ratio gradient detector 19.

The tire effective radius detector 14 detects a tire effective radius that is defined as a distance between the road and a center of each wheel based on the normal force applied on each wheel. The tire effective radius detector 14 outputs the value of the tire effective radius to the slip ratio calculator 15.

The angular velocity detector 17 includes an angular velocity sensor mounted on each wheel. The angular velocity detector 17 estimates a wheel speed of each wheel from the angular velocity of each wheel, and outputs the value of the wheel speed to the slip ratio calculator 15.

The vehicular speed detector 18 includes a vehicular speed sensor mounted on an output shaft of the transmission. The vehicular speed detector 18 detects the current running speed of the host vehicle according to the rotational speed of the output shaft of the transmission. The vehicular speed detector 18 outputs a signal of the current running speed to the slip ratio calculator 15.

The vehicular distance detector 16 detects a relative distance and a relative velocity between the host vehicle and the preceding vehicle. The vehicular distance detector 16 outputs the relative distance and the relative velocity to the safety index calculator 22.

The slip ratio gradient detector 19 analyzes the friction coefficient received from the friction coefficient calculator 10 and the slip ratio received from the slip ratio calculator 15, the values of which are determined according to one of various algorithms known in the art. Through numerical analysis, the slip ratio gradient detector 19 detects a gradient of the slip ratio as illustrated by the slip ratio graph of FIG. 6, and outputs the value of the gradient of the slip ratio to the maximum friction coefficient calculator 20.

The maximum friction coefficient calculator 20 calculates a maximum friction coefficient between the road and each tire according to an initial gradient of the slip ratio and the friction coefficient. The maximum friction coefficient calculator 20 outputs a signal of the maximum friction coefficient to the minimum safety distance calculator 21.

Figure 6:
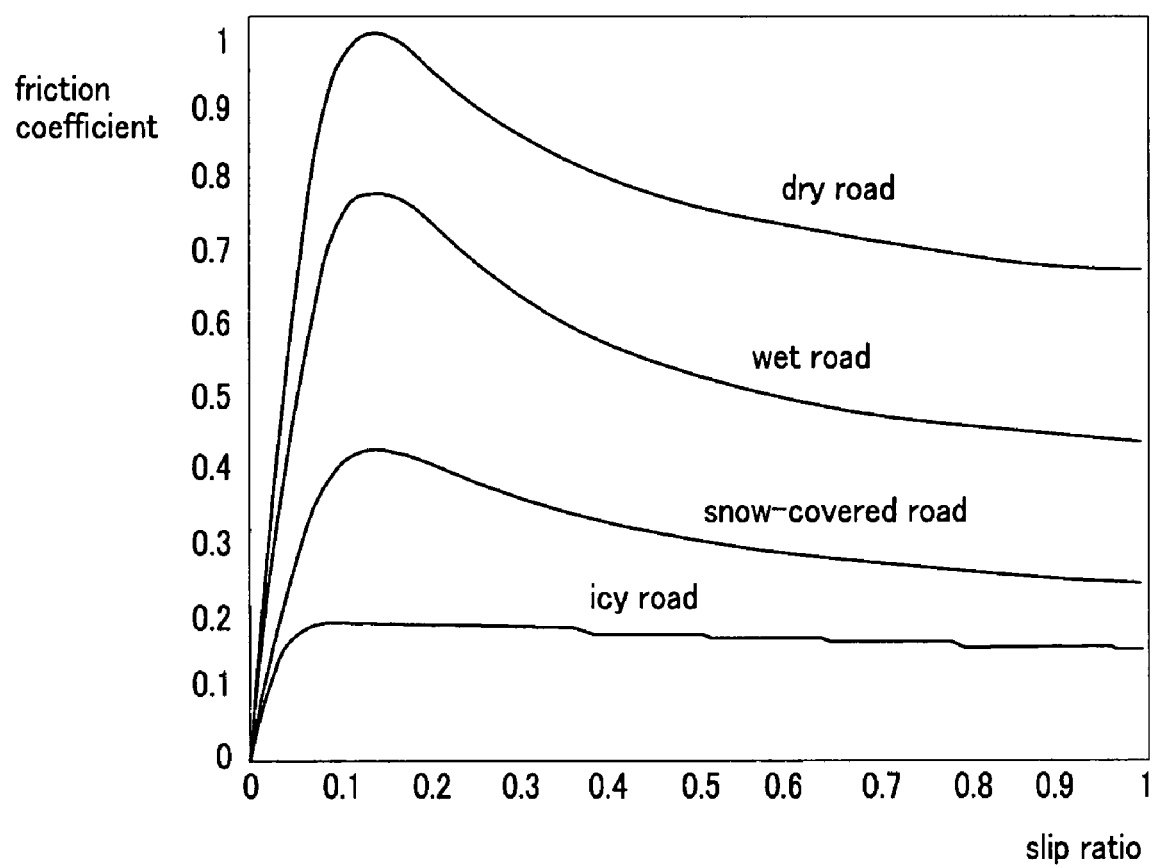
FIG. 6 is a graph showing the friction coefficient and slip ratio for various road conditions.

The maximum friction coefficient calculator 20 calculates the maximum friction coefficient according to the relation between the slip ratio and the friction coefficient. As shown in FIG. 6, the maximum friction coefficient increases with an increasing slip ratio. However, if the slip ratio is excessive, the maximum friction coefficient decreases with an increasing slip ratio.

Generally, the maximum friction coefficient of a dry road is estimated to be 1.0, and therefore the maximum deceleration thereof is determined to be 9.8 m/s² by equation 1 under this condition.

maximum deceleration=friction coefficient×acceleration of gravity (Equation 1)

The minimum safety distance calculator 21 calculates a minimum safety distance to the preceding vehicle based on the current running speed of the host vehicle and the maximum friction coefficient.

The safety index calculator 22 calculates a reference safety index and a current safety index corresponding to the minimum safety distance and the vehicular distance to the preceding vehicle respectively. The safety index calculator 22 outputs the value of the reference safety index and the current safety index to the processor 23.

The safety index can be indicated in various forms, e.g. by distance or time, but a time gap is widely used as the safety index. The time gap is defined as the time it would take the host vehicle to travel the minimum safety distance at the current running speed thereof.

The processor 23 compares the reference safety index with the current safety index and accordingly operates the actuator 24 to control the vehicular distance from the preceding vehicle when the current safety index is less than the reference safety index.

The actuator 24 decelerates the current running speed of the host vehicle to ensure the minimum safety distance is maintained from the preceding vehicle. Generally, a brake actuator or a throttle actuator is used as the actuator 24.

An exemplary method for an adaptive cruise control of a vehicle according to an embodiment of the present invention is explained as follows.

Figure 3:
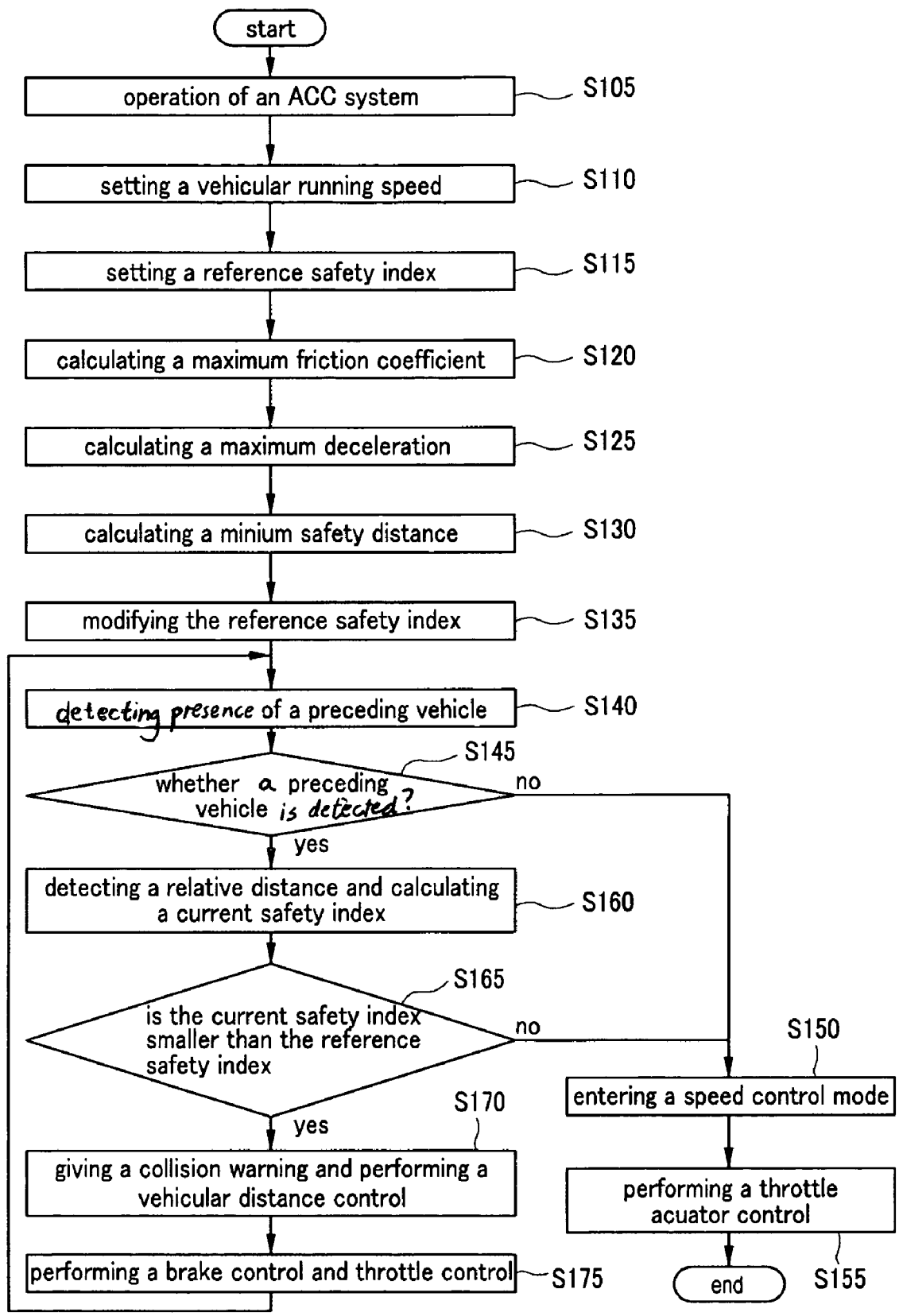
FIG. 3 shows a flowchart of an adaptive cruise control method according to an exemplary embodiment of the present invention.

As shown in FIG. 3, an ACC system operates while the host vehicle is at a running state in step S105. When a driver sets a vehicular running speed of the host vehicle at step S110, the safety index calculator 22 calculates a reference safety index which corresponds to the vehicular running speed thereof at step S115. The reference safety index enables the host vehicle to ensure the minimum safety distance is maintained away from the preceding vehicle under a dry road condition, wherein the maximum friction coefficient is 1.0.

The maximum friction coefficient calculator 20 then calculates a maximum friction coefficient of a road according to road surface and tire conditions, and outputs the value of the maximum friction coefficient to a minimum safety distance calculator 21 at step S120. As those of ordinary skill in the art will appreciate, the present invention can find application in vehicles having any number of tires. Each tire may have a different friction coefficient. The ACC system accounts for this variation between the tires by taking the highest friction coefficient to calculate the minimum safety distance.

Figure 4:
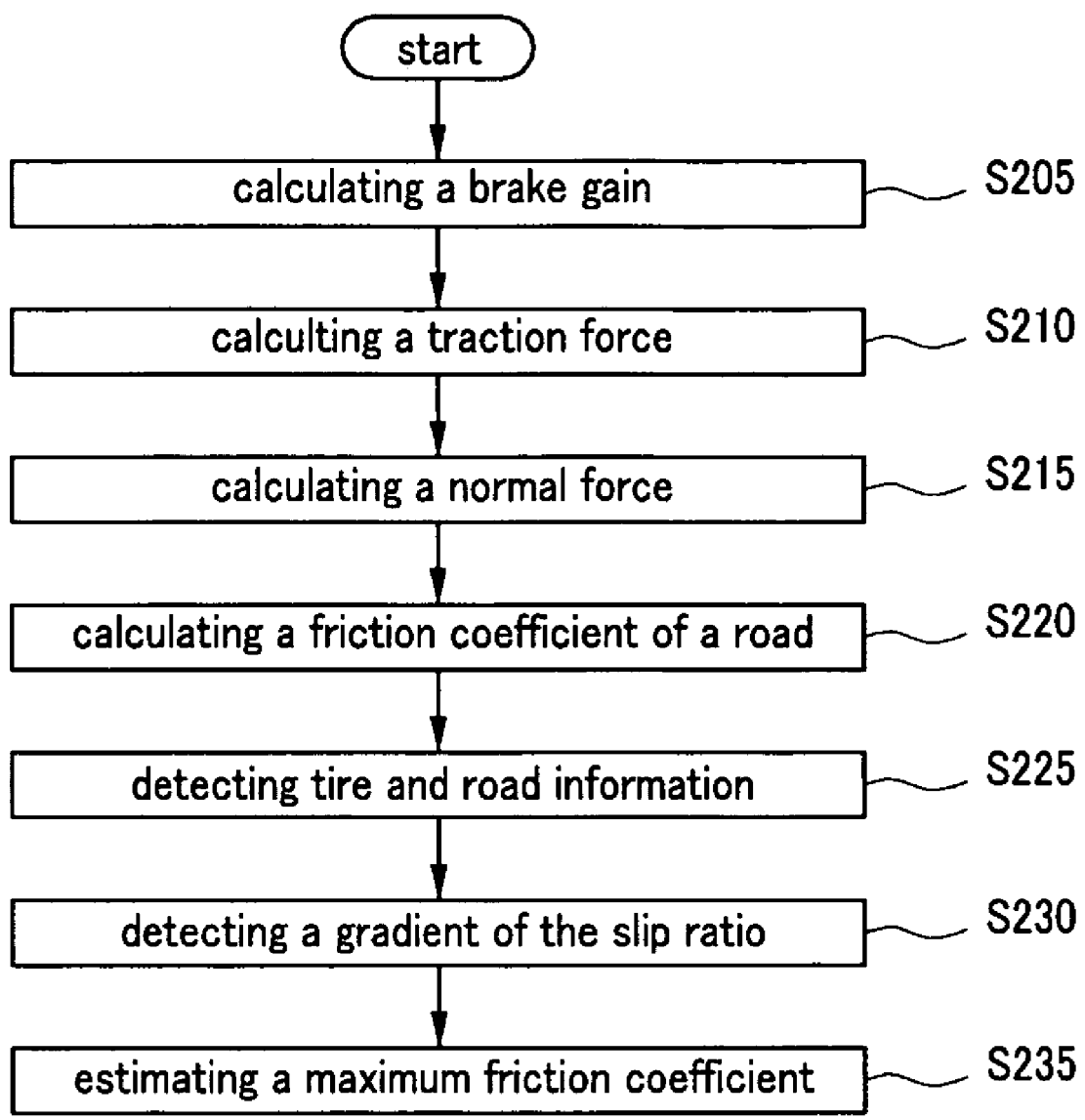
FIG. 4 shows a flowchart for estimating the maximum friction coefficient in an adaptive cruise control method according to an exemplary embodiment of the present invention.
Figure 5:
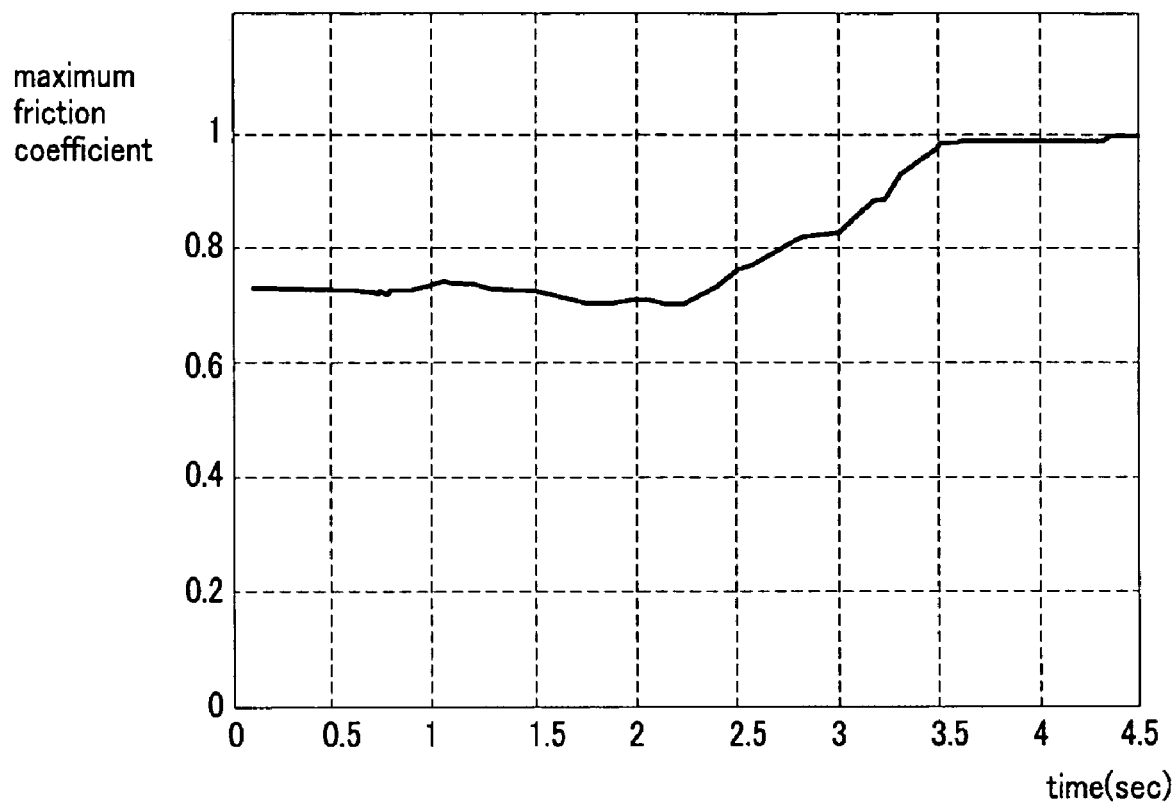
FIG. 5 is a graph of the change in estimated maximum friction coefficient over time as determined by an adaptive cruise control method according to an exemplary embodiment of the present invention as a vehicle moves from a wet road surface to a dry road surface.

Referring to FIG. 4, a process of calculating the maximum friction coefficient is explained in detail as follows.

An angular velocity of each wheel is detected by an angular velocity detector 17 mounted thereon, and a brake gain $K_B$ is calculated from brake pressure of a brake actuator at step S205.

Subsequently, a traction force that is applied horizontally on each wheel is calculated from the brake gain $K_B$ and a transmission torque $T_S$ at step S210. A normal force that is applied vertically on each wheel is calculated according to an entire vehicular weight and the dynamics of the host vehicle at step S215. Then, the friction coefficient of the road is calculated from the relation of the traction force and the normal force at step S220.

After that, tire and road information is detected at step S225. The tire information includes the brake gain $K_B$, the traction force of each wheel, the normal force of each wheel, and a tire effective radius. The tire effective radius is defined as a distance between a center of each wheel and the road. The brake gain $K_B$ is calculated from the angular velocity of each wheel and the brake pressure. The traction force that is applied horizontally on each wheel is calculated from a transmission torque $T_S$, and the normal force that is applied vertically on each wheel is calculated from the total vehicular weight and dynamics of the host vehicle.

In addition, the road information includes the wheel speed of each wheel, the current running speed of the host vehicle, and the slip ratio of each wheel. The wheel speed is detected by the angular velocity detector 17 mounted on each wheel, and the current running speed of the host vehicle is detected by the vehicular speed detector 18 mounted on an output shaft of a transmission After the road and tire information is detected, a gradient of the slip ratio is detected from the friction coefficient and the slip ratio at step S230. Then, the maximum friction coefficient is calculated from the gradient of the slip ratio at step S235.

After the maximum friction coefficient between the road and each tire is calculated, the maximum deceleration is calculated from the maximum friction coefficient and the current running speed of the host vehicle at step S125. Subsequently, the minimum safety distance from the preceding vehicle is calculated corresponding to the maximum deceleration at step S130.

After that, the reference safety index, which was set under the assumption that the friction coefficient between the road and each tire is 1.0, is adjusted so as to correspond with the minimum safety distance at step S135. To elaborate, the reference safety index is set under the assumption that the friction coefficient between the road and each tire is 1.0 at the step S115, but if the maximum friction coefficient calculated based on the actual conditions of the road surface and of each tire is less than 1.0, the reference safety index that is set at the step S115 would not be effective to ensure the minimum safety distance is kept. As such, the reference safety index of the present invention can be modified to reflect the actual tire and road conditions.

After the reference safety index is modified as described above, the presence of a preceding vehicle is checked at step S145 using one of various methods known in the art. If no preceding vehicle is detected, the ACC system enters speed control mode at step S150, and a predetermined speed is maintained by modulating a throttle actuator control at step S155.

However, if a preceding vehicle does exist, the relative distance in consideration of the relative velocity between the host vehicle and the preceding vehicle is detected by the vehicular distance detector 16, and a current safety index in accordance with the relative distance is calculated at step S160. Then, the processor 23 compares the reference safety index with the current safety index at step S165.

If the current safety index is greater than or equal to the reference safety index, the ACC system enters a speed control mode at step S150, and it maintains the predetermined running speed by performing a throttle actuator control at step S155.

However, if the current safety index is less than the reference safety index, that is, there is a risk of colliding with the preceding vehicle and the ACC system will give off a collision warning signal to the driver and perform a vehicular distance control at step S170.

The vehicular distance control is performed by a braking control or an engine torque decelerating control, wherein the relative distance between the host vehicle and the preceding vehicle is controlled so as to exceed the minimum safety distance by decelerating the current running speed of the host vehicle at step S175.

The following example is put forth so as to provide those of ordinary skill in the art with a complete disclosure and description of how the methodology of the present invention works and is not intended to limit the scope of what is regarded as the invention.

EXAMPLE

The circumstances under which the time gap is used as the safety index will hereinafter be described in detail. The minimum safety distance given a dry road surface where the maximum friction coefficient is 1.0 is about 38 m if the host vehicle is running at a speed of 100 km/h. In contrast, the minimum safety distance given a wet road surface where the maximum friction coefficient is 0.7 is about 56 m under the same conditions. Therefore, even if a driver sets the reference time gap to be 1.5 seconds in order to maintain the distance between the vehicles in excess of 41 m (1.5 sec×vehicular speed (100 km/h)=41 m), the reference time gap may be modified to 2.02 seconds in order to prevent a collision between the vehicles because the actual minimum safety distance under the above conditions is 56 m (2.02 sec×100 km/h=56m).

On the other hand, if the relative distance between the host vehicle and the preceding vehicle is 45 m when the host vehicle is running at a speed of 100 km/h, the current time gap is 1.62 seconds (1.62 sec×100 km/h=45 m). The ACC system will therefore control the vehicular distance from the preceding vehicle until the current time gap is the same as the reference time gap, 2.02 seconds.

As described above, the ACC system according to the present invention calculates the maximum friction coefficient between the road and each tire according to the condition of the road and tire in real-time, and calculates the actual minimum safety distance in accordance with the estimated maximum friction coefficient and the current running speed of the host vehicle. The reference safety index is then modified accordingly based on the actual minimum safety distance.

In addition, the ACC system according to the present invention is designed to give off a warning signal to the driver should a collision be likely and automatically decelerate the current running speed if the current safety index according to the relative distance to the preceding vehicle is less than the modified reference safety index. Safety and reliability is thereby enhanced by the adaptive ACC system and method of the present invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. An adaptive cruise control method, comprising:
    calculating a maximum friction coefficient of a road;
    calculating a minimum safety distance to a preceding vehicle based on the calculated maximum friction coefficient and a current running speed of a host vehicle;
    setting a reference safety index based on the calculated minimum safety distance;
    calculating a current safety index based on a relative distance to the preceding vehicle; and
    controlling a vehicular distance from the preceding vehicle by comparing the current safety index with the reference safety index and accordingly operating an actuator.

2. The method of claim 1, wherein the safety index is a time gap, said time gap defined as time it takes the host vehicle to travel the minimum safety distance at the current running speed thereof.

3. The method of claim 1, wherein calculating the maximum friction coefficient of the road comprises:
    calculating a brake gain;
    calculating a traction force applied on each tire;
    calculating a normal force applied on each tire;
    calculating a friction coefficient of the road on which the host vehicle is running;
    detecting tire and road information;
    calculating a slip ratio and detecting a gradient thereof; and
    estimating the maximum friction coefficient based on the friction coefficient and the gradient of the slip ratio.

4. The method of claim 3, wherein the brake gain is calculated from a brake pressure that is applied by a brake actuator and an angular velocity of each wheel.

5. The method of claim 3, wherein the traction force is calculated from a transmission torque and the brake gain.

6. The method of claim 5, wherein the transmission torque is calculated from a torque converter torque and the angular velocity of each wheel.

7. The method of claim 6, wherein the torque converter torque is calculated from an engine torque, a carrier speed, and a gear condition.

8. The method of claim 7, wherein the engine torque is calculated from a degree of throttle opening and an engine speed.

9. The method of claim 3, wherein the normal force is calculated from a total vehicular weight and dynamics of the host vehicle.

10. The method of claim 3, wherein the tire information comprises information of the brake gain, the traction force, the normal force, and a tire effective radius.

11. The method of claim 10, wherein the tire effective radius is defined as the distance between the road and a center of each wheel.

12. The method of claim 3, wherein the road information comprises a wheel speed of each wheel, current running speed of the host vehicle, and slip ratio of each wheel.

13. The method of claim 12, wherein the wheel speed of each wheel is detected by an angular velocity detector mounted on each wheel.

14. The method of claim 12, wherein the current running speed of the host vehicle is detected by a vehicular speed detector mounted on an output shaft of a transmission.

15. The method of claim 3, wherein the slip ratio is calculated from the angular velocity of each wheel, the current running speed, and the tire effective radius.

16. A system of an adaptive cruise control of a vehicle, comprising:
    a friction coefficient calculator for calculating a friction coefficient of a road;
    a slip ratio calculator for calculating a slip ratio between the road and each tire;

a vehicular distance detector for detecting a current vehicular distance to a preceding vehicle;

a slip ratio gradient detector for detecting a gradient of the slip ratio based on the friction coefficient and the slip ratio, the slip ratio gradient detector receiving a signal of the friction coefficient from the friction coefficient calculator and a signal of the slip ratio from the slip ratio calculator;

a maximum friction coefficient calculator for calculating a maximum friction coefficient between the road and each tire based on the gradient of the slip ratio, the maximum friction coefficient calculator receiving a signal of the gradient of the slip ratio from the slip ratio gradient detector;

a minimum safety distance calculator for calculating a minimum safety distance corresponding to the current running speed of the host vehicle based on the maximum friction coefficient, the minimum safety distance calculator receiving a signal of the maximum friction coefficient from the maximum friction coefficient calculator;

a safety index calculator for calculating a reference safety index and a current safety index corresponding to the minimum safety distance and the current vehicular distance to the preceding vehicle respectively, the safety index calculator receiving a signal of the minimum safety distance from the minimum safety distance calculator and a signal of the current vehicular distance from the vehicular distance detector;

a processor for comparing the current safety index with the reference safety index and generating a control signal thereby, the processor receiving a signal of the reference safety index and the current safety index from the safety index calculator; and an actuator for controlling the current running speed of the host vehicle, the actuator receiving the control signal from the processor.

17. The system of claim 16, wherein the friction coefficient calculator comprises:
   a traction force calculator for calculating a traction force applied on each tire; and
   a normal force calculator for calculating a normal force applied on each tire.

18. The system of claim 16, wherein the slip ratio calculator comprises:
   a tire effective radius detector for detecting a distance between the road and a center of each tire;
   an angular velocity detector mounted on each wheel for detecting an angular velocity thereof; and
   a vehicular speed detector for detecting the current running speed of the host vehicle.

19. The system of claim 17, wherein the traction force calculator comprises:
   a brake gain calculator for calculating a brake gain based on brake pressure and the angular velocity of each wheel; and
   a transmission torque calculator for calculating a transmission torque based on a torque converter torque and the angular velocity of each wheel.

20. The system of claim 18, wherein the angular velocity detector comprises an angular velocity sensor mounted on each wheel.

21. The system of claim 18, wherein the vehicular speed detector comprises a vehicular speed sensor mounted on an output shaft of the transmission.

* * * * *